United States Patent
Speldrich

(10) Patent No.: US 8,104,340 B2
(45) Date of Patent: Jan. 31, 2012

(54) FLOW SENSING DEVICE INCLUDING A TAPERED FLOW CHANNEL

(75) Inventor: Jamie Speldrich, Freeport, MN (US)

(73) Assignee: Honeywell International Inc., Morristown, NJ (US)

( * ) Notice: Subject to any disclaimer, the term of this patent is extended or adjusted under 35 U.S.C. 154(b) by 170 days.

(21) Appl. No.: 12/339,856

(22) Filed: Dec. 19, 2008

(65) Prior Publication Data

US 2010/0154559 A1     Jun. 24, 2010

(51) Int. Cl.
*G01F 1/68*     (2006.01)

(52) U.S. Cl. .................................. 73/202.5; 73/204.21

(58) Field of Classification Search .......................... None
See application file for complete search history.

(56) References Cited

U.S. PATENT DOCUMENTS

| | | | |
|---|---|---|---|
| 2,746,296 A | 5/1956 | Stover | |
| 3,410,287 A | 11/1968 | Van Der Heyden et al. | |
| 3,559,482 A | 2/1971 | Baker et al. | |
| 3,785,206 A | 1/1974 | Benson et al. | |
| 3,838,598 A | 10/1974 | Tompkins | |
| 3,895,531 A | 7/1975 | Lambert | |
| 3,952,577 A | 4/1976 | Hayes et al. | |
| 4,041,757 A | 8/1977 | Baker et al. | |
| 4,343,194 A | 8/1982 | Dehart et al. | |
| 4,444,060 A | 4/1984 | Yamamoto | |
| 4,481,828 A | 11/1984 | Cheng | |
| 4,546,655 A | 10/1985 | Victor | |
| 4,581,945 A | 4/1986 | Rusz | |
| 4,668,102 A | 5/1987 | Mott | |
| 4,677,858 A | 7/1987 | Ohnhaus | |
| 4,696,194 A | 9/1987 | Taylor et al. | |
| 4,768,386 A | 9/1988 | Taddeo | |
| 4,825,704 A | 5/1989 | Aoshima et al. | |
| 5,000,478 A | 3/1991 | Kerastas | |
| 5,063,786 A * | 11/1991 | Sanderson et al. | .......... 73/861.19 |
| 5,088,332 A | 2/1992 | Merilainen et al. | |
| 5,379,650 A | 1/1995 | Kofoed et al. | |
| 5,481,925 A | 1/1996 | Woodbury | |
| 5,535,633 A | 7/1996 | Kofoed et al. | |
| 5,537,870 A * | 7/1996 | Zurek et al. | ..................... 73/202 |
| 5,735,267 A | 4/1998 | Tobia | |
| 5,736,651 A | 4/1998 | Bowers | |

(Continued)

FOREIGN PATENT DOCUMENTS

EP     0255056     12/1991

(Continued)

*Primary Examiner* — Harshad Patel

(74) *Attorney, Agent, or Firm* — Seager, Tufte & Wickhem, LLC

(57) ABSTRACT

A fluid flow sensing device can include a tapered fluid flow channel formed into a main channel defining a fluid flow tube as an alternate fluid flow path. A tapered fluid flow channel can bypass some fluid flow from the main fluid flow channel into the alternate fluid flow path and a flow sensor disposed within the alternate fluid flow path. The tapered flow channel is tapered in a direction of fluid flow toward the flow sensor to thereby reduce flow eddies and enable optimal sensing performance by fluid flow sensor. An upstream fluid flow channel and a downstream fluid flow channel can be molded into the main fluid flow channel, especially bypassed in the fluid flow path of the main fluid flow channel. A fluid flow sensor can be placed between the upstream fluid flow channel and the downstream fluid flow channel for measuring fluid flow rate the channel.

24 Claims, 3 Drawing Sheets

U.S. PATENT DOCUMENTS

| | | | |
|---|---|---|---|
| 5,789,660 A | 8/1998 | Kofoed et al. | |
| 5,792,958 A | 8/1998 | Speldrich | |
| 5,817,950 A | 10/1998 | Wiklund et al. | |
| 5,861,561 A | 1/1999 | Van Cleve et al. | |
| 6,044,716 A | 4/2000 | Yamamoto | |
| 6,119,730 A | 9/2000 | McMillan | |
| 6,164,143 A | 12/2000 | Evans | |
| 6,308,553 B1 * | 10/2001 | Bonne et al. | 73/1.35 |
| 6,312,389 B1 | 11/2001 | Kofoed et al. | |
| 6,526,822 B1 * | 3/2003 | Maeda et al. | 73/204.21 |
| 6,527,385 B2 | 3/2003 | Koitabashi et al. | |
| 6,543,449 B1 | 4/2003 | Woodring et al. | |
| 6,553,808 B2 * | 4/2003 | Bonne et al. | 73/24.01 |
| 6,561,021 B2 * | 5/2003 | Uramachi et al. | 73/202.5 |
| 6,591,674 B2 | 7/2003 | Gehman et al. | |
| 6,655,207 B1 * | 12/2003 | Speldrich et al. | 73/202.5 |
| 6,681,623 B2 | 1/2004 | Bonne et al. | 73/202 |
| 6,715,339 B2 * | 4/2004 | Bonne et al. | 73/24.01 |
| 6,742,399 B2 | 6/2004 | Kunz et al. | 73/861.52 |
| 6,761,165 B2 | 7/2004 | Strickland, Jr. | |
| 6,769,299 B2 | 8/2004 | Forster et al. | |
| 6,779,393 B1 * | 8/2004 | Muller et al. | 73/202.5 |
| 6,871,534 B1 * | 3/2005 | Hamada et al. | 73/204.22 |
| 6,871,537 B1 | 3/2005 | Gehman et al. | |
| 6,901,795 B2 | 6/2005 | Naguib et al. | |
| 6,904,799 B2 | 6/2005 | Cohen et al. | |
| 6,904,907 B2 | 6/2005 | Speldrich et al. | 128/200.23 |
| 6,907,787 B2 | 6/2005 | Cook et al. | |
| 6,915,682 B2 * | 7/2005 | Renninger et al. | 73/114.34 |
| 6,957,586 B2 | 10/2005 | Sprague | |
| 7,000,298 B2 | 2/2006 | Cook et al. | |
| 7,000,612 B2 | 2/2006 | Jafari et al. | |
| 7,043,978 B2 * | 5/2006 | Goka et al. | 73/202.5 |
| 7,059,184 B2 | 6/2006 | Kanouda et al. | |
| 7,100,454 B2 | 9/2006 | Hasunuma | |
| 7,243,541 B1 | 7/2007 | Bey et al. | |
| 7,258,003 B2 | 8/2007 | Padmanabhan et al. | 73/204.26 |
| 7,278,309 B2 | 10/2007 | Dmytriw et al. | 73/204.26 |
| 7,278,326 B2 | 10/2007 | Kobayashi et al. | |
| 7,337,677 B2 | 3/2008 | Mizohata | |
| 7,343,823 B2 | 3/2008 | Speldrich | |
| 7,353,719 B2 | 4/2008 | Hiura et al. | |
| 7,373,819 B2 | 5/2008 | Engler | |
| 7,430,918 B2 | 10/2008 | Selvan et al. | |
| 7,472,580 B2 | 1/2009 | Lyons et al. | |
| 7,520,051 B2 | 4/2009 | Becke et al. | |
| 7,603,898 B2 | 10/2009 | Speldrich | |
| 7,631,562 B1 * | 12/2009 | Speldrich | 73/861.52 |
| 7,647,835 B2 | 1/2010 | Speldrich | |
| 7,654,157 B2 | 2/2010 | Speldrich | |
| 7,661,303 B2 * | 2/2010 | Kohno et al. | 73/202.5 |
| 7,730,793 B2 | 6/2010 | Speldrich | |
| 2003/0062045 A1 | 4/2003 | Woodring et al. | |
| 2004/0094151 A1 | 5/2004 | Speldrich et al. | |
| 2004/0216526 A1 | 11/2004 | Cook et al. | |
| 2005/0016534 A1 | 1/2005 | Ost | |
| 2005/0022594 A1 | 2/2005 | Padmanabhan et al. | |
| 2005/0039809 A1 | 2/2005 | Speldrich | |
| 2005/0087190 A1 | 4/2005 | Jafari et al. | |
| 2005/0183500 A1 | 8/2005 | Kanouda et al. | |
| 2005/0231067 A1 | 10/2005 | Cook et al. | |
| 2005/0247106 A1 | 11/2005 | Speldrich | |
| 2005/0247107 A1 | 11/2005 | Speldrich | |
| 2006/0017207 A1 | 1/2006 | Bechtold | |
| 2006/0017208 A1 | 1/2006 | Bechtold | |
| 2006/0112771 A1 | 6/2006 | Mizohata | |
| 2006/0201247 A1 | 9/2006 | Speldrich et al. | |
| 2006/0225488 A1 | 10/2006 | Speldrich | |
| 2007/0074569 A1 | 4/2007 | Engler | |
| 2007/0176010 A1 | 8/2007 | Figi | |
| 2007/0186643 A1 | 8/2007 | Speldrich et al. | |
| 2007/0193368 A1 | 8/2007 | Speldrich | 73/861.52 |
| 2007/0204688 A1 | 9/2007 | Dmytriw et al. | |
| 2008/0010821 A1 | 1/2008 | Padmanabhan et al. | 29/842 |
| 2008/0163683 A1 | 7/2008 | Becke et al. | |
| 2008/0314118 A1 | 12/2008 | Bey, Jr. et al. | |
| 2009/0071260 A1 | 3/2009 | Speldrich | |
| 2009/0139347 A1 | 6/2009 | Speldrich | |
| 2009/0139348 A1 | 6/2009 | Speldrich | |
| 2009/0158838 A1 | 6/2009 | Speldrich | |
| 2009/0265144 A1 | 10/2009 | Speldrich | |
| 2010/0013165 A1 | 1/2010 | Speldrich | |
| 2010/0101332 A1 | 4/2010 | Speldrich | |
| 2010/0154532 A1 | 6/2010 | Becke et al. | |
| 2010/0154559 A1 | 6/2010 | Speldrich | |

FOREIGN PATENT DOCUMENTS

| | | |
|---|---|---|
| WO | 9221940 | 12/1992 |
| WO | 0161282 | 8/2001 |
| WO | 2007095528 | 8/2007 |
| WO | 2008070603 | 6/2008 |

* cited by examiner

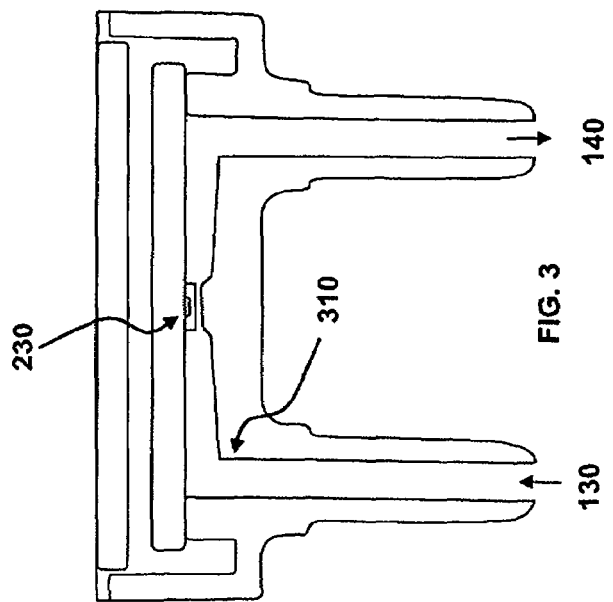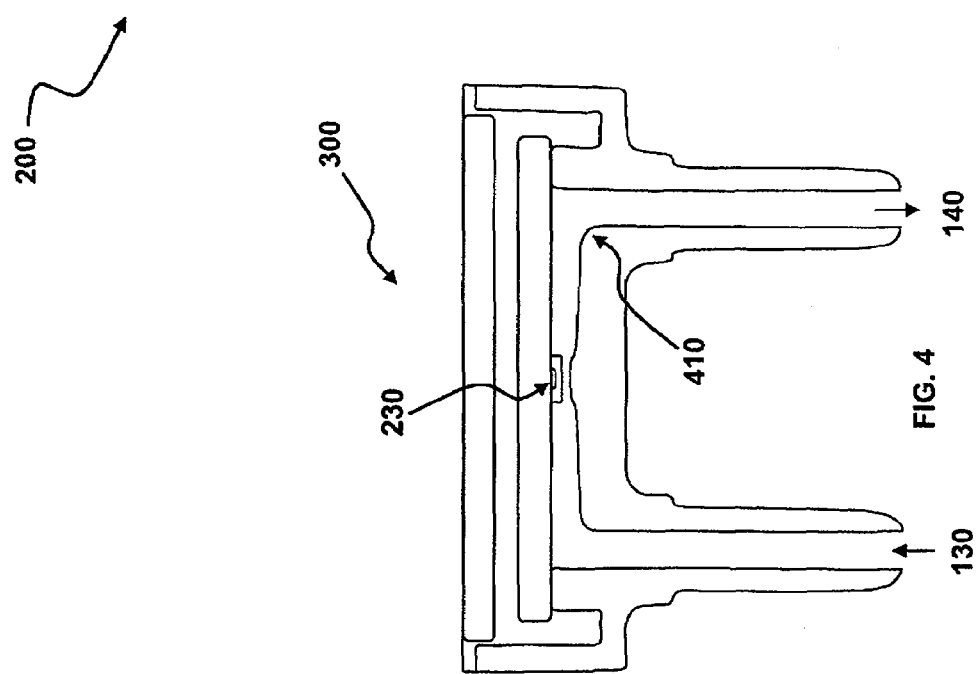

FLOW SENSING DEVICE INCLUDING A TAPERED FLOW CHANNEL

TECHNICAL FIELD

Embodiments are generally related to flow sensing devices and methods. Embodiments are also related to airflow sensors. Embodiments are additionally related to an improved flow channel for controlling flow eddies.

BACKGROUND OF THE INVENTION

Several flow systems utilizes fluid flow rate control mechanisms for controlling the amount of fluid, which may be in gaseous (e.g., air) or liquid form passing through a flow channel. Flow control mechanisms might also be utilized to regulate flow rates in systems such as ventilators and respirators for maintaining a sufficient flow of breathable air or providing sufficient anesthetizing gas to a patient in preparation for surgery. Typically, flow rate control occurs through the utilization of control circuitry responsive to measurements obtained from fluid flow sensors. Such flow sensors can apparently measure the flow rate of the fluid by sampling the fluid along the wall of the flow channel.

In one implementation, flow sensors are positioned between upstream and downstream sides of the flow channel relative to the direction of the fluid flow to be measured. Airflow sensing devices generally have flow channels with constant up and downstream channel height. These upstream and downstream sides of the flow channel can create a difference in pressure and flow velocity of the fluid across the flow sensors, which leads to turbulent flow effects and flow eddies in the flow channel. The flow eddies can create instability in the fluid flow, which results in unstable output by the flow sensors. Further, the flow sensors may require additional flow restriction in the flow path of the flow channel, especially in a bypass of the flow channel, in order to limit the amount of fluid flow through the sensor and avoid output saturation.

The majority of prior flow sensors require precise and accurate alignment of the fluid flow path across sensing components of the flow sensors in order to avoid flow eddies in the flow channel. The precise and accurate alignment of the fluid flow path can increase the optimal performance of the flow sensors. Such approach requires extra precision can lead to extra design or set up time, and thus extra expensive, during the manufacturing of the flow sensors. Additionally, the flow channel may not produce uniform, laminarizing flow of the fluid due to non-uniformities in a cross-sectional area and position of the upstream and downstream channels in the flow channel.

In an effort to address the foregoing difficulties, it is believed that a need exists for an improved and inexpensive flow channel that reduces flow eddies and stabilizes a sensor output signal. It is believed that the improved flow channel disclosed herein can address these and other continuing needs.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide improved fluid flow sensing device.

It is another aspect of the present invention to provide a fluid flow sensor with an improved flow channel that can reduce or prevent unwanted flow eddies from forming within fluid flowing through the flow path leading to a sensor.

The aforementioned aspects and other objectives and advantages can now be achieved as described herein. A flow sensing device comprises a main flow channel defining a fluid (e.g., gas or liquid) flow path, through which a fluid flows. An upstream flow channel and a downstream flow channel can be molded into the main flow channel, with a sensor region bypassing the flow path of the main flow channel. A fluid flow sensor can be placed between the upstream flow channel and the downstream flow channel for measuring a flow rate of the fluid in the flow channel. In the present invention, the upstream flow channel is tapered in a direction toward the airflow sensor. The downstream flow channel can also be tapered. Tapered upstream and downstream flow channels reduce flow eddies across the flow sensor, and thereby enhancing flow stability and stabilizing a sensor output signal, which leads to optimal sensing performance of the flow sensor.

In accordance with another feature of the present invention, at least one tapered flow channel formed into a main flow channel defining a flow tube as an alternate fluid flow path, wherein said at least one tapered flow channel bypasses some fluid flow from the main flow channel into said alternate fluid flow path. A flow sensor disposed within said alternate fluid flow path, wherein said tapered flow channel is tapered in a direction of fluid flow toward said flow sensor to thereby reduce flow eddies and enables optimal sensing performance by said flow sensor.

Furthermore, the sensing device can also include a set of narrow flow restrictors, which can be arranged within the main flow channel in order to limit the flow rate of the fluid across the flow sensor by limiting flow in the main flow channel and the flow tube and/or alternate flow path. The main flow channel can preferably exhibit a cross-sectional shape and size compatible with flow systems. The upstream and downstream flow channels, or alternate flow path, can be tapered by increasing a height at a flow inlet and reducing it when the upstream and downstream flow channels approach towards the airflow sensor. Therefore, the flow velocity of the fluid can be more stable when the fluid flow changes direction from the main flow channel into the upstream flow channel. Hence, the sensing device can produce uniform flow of the fluid across the airflow sensor for more accurate flow measurements.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 3 illustrates a schematic cross-sectional view of a flow sensing device, in accordance with features of the present invention; and FIG. 4 illustrates another schematic cross-sectional view of an airflow sensor with tapered upstream and downstream flow channels as shown in FIG. 3, in accordance with features of the present invention.

DETAILED DESCRIPTION

Figure 1:
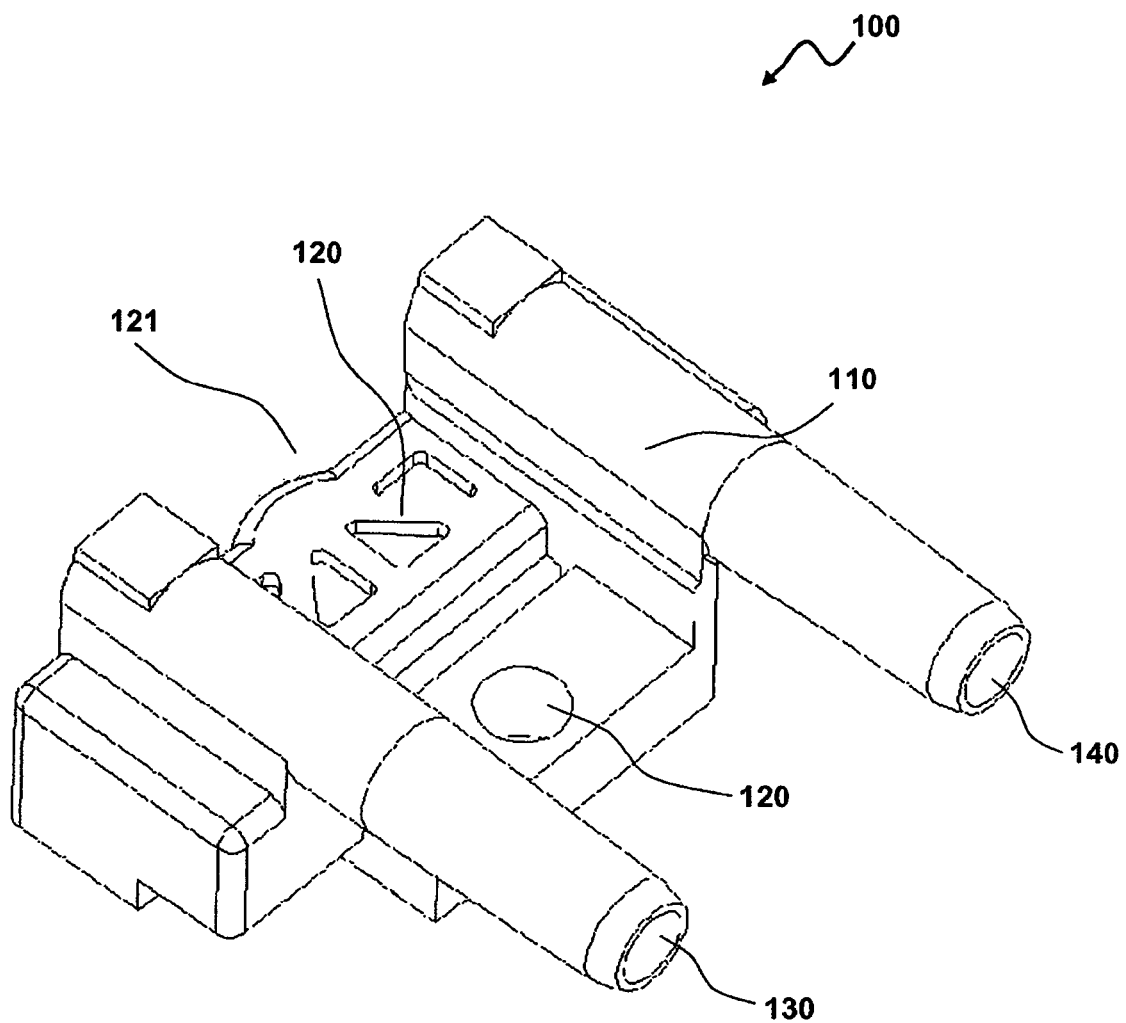
FIG. 1 illustrates a general perspective view of a flow sensing device, which can be adapted for use in implementing a preferred embodiment.

The particular values and configurations discussed in these non-limiting examples can be varied and are cited merely to illustrate at least one embodiment and are not intended to limit the scope thereof. Note that in FIGS. 1-5 identical parts or elements are generally indicated by identical reference numerals.

Figure 2:
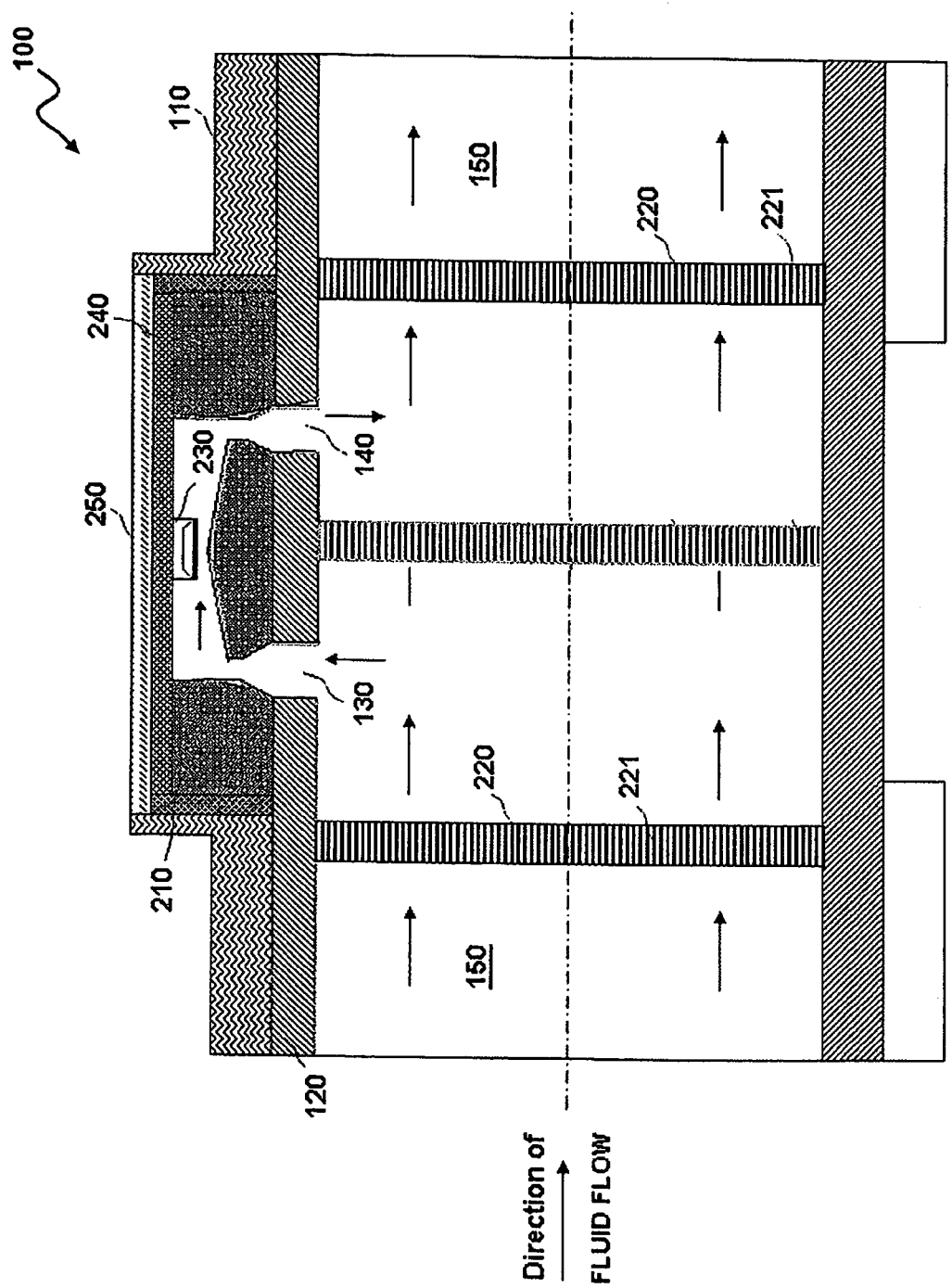
FIG. 2 illustrates a schematic cross-sectional view of the flow sensing device, in accordance with features of the present invention.

Referring to FIG. 1, a general perspective view of a flow sensing device 100 is illustrated, which can be adapted for use in implementing a preferred embodiment. The flow sensing device 100 can be disposed in a flow path 121 defined by a main flow channel 120, so that a fluid 150, as illustrated in FIG. 2, can enter and exit the main flow channel 120. Note that as utilized herein the term "fluid" can refer to a gas or a liquid. Thus, the flow sensing device 100 disclosed herein can be utilized in a flow system (not shown) for measuring a flow rate of the fluid (e.g., air or gas) flow 150. Note that the embodiments discussed herein generally relate to an airflow sensing system or apparatus. It can be appreciated, however, that such embodiments can be implemented in the context of other sensing systems and designs, and are not limited to the airflow sensing technique. The discussion of airflow sensing systems, as utilized herein, is presented for exemplary purposes.

Referring to FIG. 2, a schematic cross-sectional view of the flow sensing device 100 is illustrated, in accordance with a preferred embodiment. The main flow channel 120 can be integrally arranged with an upstream flow channel 130 and a downstream flow channel 140 connecting the main flow channel 120 to a flow tube 210, which are completely covered by a body 110 of the flow sensing device 100. The upstream flow channel 130 and the downstream flow channel 140 can also form a passage into a plastic flow tube 210, as illustrated in FIGS. 3-4. The plastic flow tube 210 contains a flow sensor 230. The upstream and downstream flow channels 130 and 140 are parallel with each other. The main flow channel 120 can direct the fluid 150 to flow across a flow sensor 230, as illustrated in FIG. 2, by passing it through the upstream and downstream flow channels 130 and 140. Therefore, the flow of fluid 150 passes from the upstream flow channel 130 to the downstream flow channel 140 in the main flow channel 120.

The body 110 of the flow sensing device 100 can generally comprise a cylindrical shape with the upstream and downstream flow channels 130 and 140. The flow sensor 230 of the sensing device 100 can be implemented by means of semiconductor and integrated circuit fabrication techniques. The main flow channel 120 and the upstream and downstream flow channels 130 and 140 can preferably exhibit a cross-sectional shape and size compatible with the flow system including tapered entry into the flow tube 210. Such sensing device 100 can quantify mass flow rates of the fluid 150 with a greater signal-to-noise ratio in order to achieve an improvement in accuracy and resolution in fluid flow rate measurements.

The flow sensing device 100 can be utilized in numerous flow systems, such as reactors, ventilators and respirators, for accurately measuring the flow rate of the fluid 150 along the flow path 121 of the main flow channel 120. The direction of the fluid 150 in the main flow channel 120 and a plastic flow tube 210 is clearly illustrated in FIG. 2.

Flow sensing device 100 can also include flow restrictors 220 that are placed within the main flow channel 120. In particular, these flow restrictors 220 can be positioned adjacent to the upstream and downstream flow channels 130 and 140, respectively. The flow restrictors 220 can include a set of cutout orifices 221 formed therein in order to control the flow of fluid 150 through the main flow channel 120. The flow restrictors 220 can especially manage the flow of the fluid 150 along the upstream and downstream flow channels 130 and 140. At least the upstream flow channel 130 is tapered in direction towards the flow sensor 230. Both the upstream and downstream flow channels 130 and 140 can be tapered, as illustrated in FIGS. 3 and 4. Both flow channels 130, 140 being tapered allows for the possibility of receiving and controlling bi-directional flow through the main flow channel 121 of the sensor 100 in order to allow the management of flow into the flow tube 210 and over the sensor 230. Such tapered upstream and downstream flow channels 130 and 140 can be provided easily and inexpensively, since it can be molded into the main flow channel 120.

In operation, a portion of the fluid 150 can flow through the tapered upstream flow channel 130 when the fluid 150 flows through the main flow channel 120 in the direction more clearly indicated in a cross-sectional side view of a flow sensor. A tapered upstream flow channel 130 can restrict the flow rate of the fluid 150 to provide uniform flow of the fluid 150 across the airflow sensor 230. Therefore, the airflow sensor 230 can measure the flow rate of the fluid 150 in an accurate manner. The airflow sensor 230 can be displaced on a substrate 240 provided with a cover 250. The cover 250 can be disposed against a rear side of the substrate 240 to protect the airflow sensor 230 from environmental effects. Thereafter, the fluid 150 in the flow tube 210 can again flow through the main flow channel 120 via the tapered downstream flow channel 140, after measuring the flow rate of the fluid 150.

Referring to FIGS. 3-4, cross sectional side views of a flow sensor 200, 300 is illustrated. The flow channel can include sharp, standard corners 310 where through fluid is able to flow. The sharp edges can cause restriction of fluid flowing, therefore rounded corners 410 are shown in the flow sensor 300 show in FIG. 4. The rounded corner within the flow path enable fluid to flow smoother than that shown in FIG. 3.

The features of the present invention can be simply provided wherein at least one tapered flow channel formed into a main flow channel defining a flow tube as an alternate fluid flow path, wherein said at least one tapered flow channel bypasses some fluid flow from the main flow channel into said alternate fluid flow path. A flow sensor disposed within said alternate fluid flow path, wherein said tapered flow channel is tapered in a direction of fluid flow toward said flow sensor to thereby reduce flow eddies and enables optimal sensing performance by said flow sensor. In this configuration, the sensing device can include at least one narrow flow restrictor arranged within the main flow channel in order to limit the flow rate of the fluid across the flow sensor by limiting flow in the main flow channel and the flow tube and/or alternate flow path.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A fluid flow sensing device for use in sensing a flow of a fluid through a main channel, the fluid flow sensing device comprising:

a housing defining:
  an input port configured to be in fluid communication with the main channel;
  an outlet port configured to be in fluid communication with the main channel downstream of the input port;
  a flow channel extending between the input port and the output port, wherein the flow channel includes an upstream fluid flow channel connected to the input port, a downstream fluid flow channel connected to the outlet port, and an interconnecting fluid flow channel extending between the upstream fluid flow channel and the downstream fluid flow channel, wherein the interconnecting fluid flow channel includes a first tapered region and a second tapered region, wherein the first and second tapered regions are tapered from a larger inner dimension to a smaller inner dimension in a direction of fluid flow through the flow channel, wherein the first tapered region is tapered at a first taper rate and the second tapered region is tapered at a second taper rate, wherein the second taper rate is greater in magnitude than the first taper rate; and
  a fluid flow sensor positioned in the interconnecting fluid flow channel downstream of the first and second tapered regions and exposed to the flow channel of the housing for measuring the fluid flow through the flow channel of the housing.

2. The flow sensing device of claim 1, further comprising:
at least one fluid flow restrictor arranged within said main channel upstream of the input port of the housing, said at least one fluid flow restrictor restricting a fluid flow rate within said main channel and said flow channel of the housing.

3. The flow sensing device of claim 1, wherein said first tapered region is tapered by reducing a cross-sectional dimension of the first tapered region as said first tapered region approaches the fluid flow sensor.

4. The flow sensing device of claim 3, wherein said cross-sectional dimension of the first tapered region is continuously reduced along at least part of the first tapered region.

5. The flow sensing device of claim 1, wherein the fluid comprises a gas or a liquid.

6. The flow sensing device of claim 1, wherein said main channel has a cross-sectional shape selected from a group comprising triangle, square, rectangle, semi-circle and semi-oval.

7. The flow sensing device of claim 1, wherein the flow channel includes a third tapered region and a fourth tapered region positioned downstream of the fluid flow sensor in the interconnecting fluid flow channel, wherein the third and fourth tapered regions are tapered from a smaller inner dimension to a larger inner dimension in a direction of fluid flow through the flow channel, wherein the third tapered region is tapered at a third taper rate and the fourth tapered region is tapered at a fourth taper rate that is less than the third taper rate.

8. The fluid flow sensing device of claim 7, wherein the third tapered region is upstream of the fourth tapered region.

9. The fluid flow sensing device of claim 1, wherein the first tapered region is upstream of the second tapered region.

10. A fluid flow sensing device, comprising:
a main fluid flow channel defining at least one fluid flow path, through which a fluid flows;
a bypass flow channel defined at least in part by an upstream fluid flow channel, a downstream fluid flow channel, and an interconnecting fluid flow channel, wherein said interconnecting fluid flow channel includes a first end connected to the upstream fluid flow channel and a second end connected to the downstream fluid flow channel, wherein the interconnecting fluid flow channel extends substantially perpendicular to the upstream fluid flow channel and the downstream fluid flow channel, wherein said upstream fluid flow channel, said downstream fluid flow channel and said interconnecting fluid flow channel collectively provide an additional fluid flow path for fluid flowing through said main fluid flow channel; and
a fluid flow sensor disposed between said upstream flow channel and said downstream fluid flow channel along the interconnecting fluid flow channel for measuring a fluid flow rate of the fluid flowing through said interconnecting fluid flow channel, wherein the interconnecting fluid flow channel includes a first region and a second region upstream of the fluid flow sensor, wherein the first region extends a majority of a distance between the upstream fluid flow channel and the fluid flow sensor and has an inner dimension that is reduced in cross-section following a first taper rate profile from the upstream flow channel towards the fluid flow sensor, and the second region has an inner dimension that is reduced in cross-section following a second taper rate profile from the first region towards the fluid flow sensor.

11. The flow sensing device of claim 10, further comprising:
at least one fluid flow restrictor arranged within said main fluid flow channel upstream of the upstream fluid flow channel, said at least one fluid flow restrictor provided to limit fluid flow rate within said main fluid flow channel and said interconnecting fluid flow channel.

12. The flow sensing device of claim 10, wherein said interconnecting fluid flow channel includes a third region and a fourth region downstream of the fluid flow sensor, wherein the third region has an inner dimension that is reduced in cross-section following the first taper rate profile in a direction from the downstream flow channel towards the fluid flow sensor, and the fourth region has an inner dimension that is reduced in cross-section following the second taper rate profile from the third region towards the fluid flow sensor.

13. The fluid flow sensing device of claim 10, wherein the fluid comprises a gas or a liquid.

14. The flow sensing device of claim 10, wherein said main flow channel has a cross-sectional shape selected from a group comprising triangle, square, rectangle, semi-circle and semi-oval.

15. The fluid flow sensing device of claim 10, wherein at least one of the upstream fluid flow channel and said downstream fluid flow channel include a rounded inner corner when transitioning to the interconnecting fluid flow channel to reduce eddy currents in the interconnecting fluid flow channel.

16. A fluid flow sensing device, comprising:
a bypass fluid flow channel in fluid communication with a main fluid flow channel, wherein the bypass fluid flow channel provides a bypass for at least some fluid flow from the main fluid flow channel;
a fluid flow sensor exposed to said bypass fluid flow channel, wherein said bypass fluid flow channel includes a first bend positioned upstream of the fluid flow sensor, said bypass fluid flow channel including a first tapered region extending between an end of the first bend and the fluid flow sensor, wherein the first tapered region is tapered in a direction of fluid flow toward said fluid flow sensor, wherein a first portion of the first tapered region is tapered at a first taper rate and a second portion of the first tapered region is tapered at a second taper rate, wherein the first taper rate is different from the second taper rate, wherein the first portion of the first tapered region extends a majority of a distance from the first bend to the fluid flow sensor; and at least one flow restrictor arranged within said main fluid flow channel.

17. The fluid flow sensing device of claim 16, wherein said first tapered region of the bypass fluid flow channel is tapered by increasing an inner dimension toward a fluid flow inlet and reducing the inner dimension as said first tapered region approaches the fluid flow sensor.

18. The fluid flow sensing device of claim 16, wherein the fluid comprises a gas or a liquid.

19. The fluid flow sensing device of claim 16, wherein said main fluid flow channel has a cross-sectional shape selected from a group comprising triangle, square, rectangle, semi-circle and semi-oval.

20. The flow sensing device of claim 16, wherein said bypass fluid flow channel includes a second tapered region downstream of the fluid flow sensor, wherein a first portion of the second tapered region is tapered at a third taper rate and a second portion of the second tapered region is tapered at a fourth taper rate, wherein the third taper rate is different from the fourth taper rate.

21. The flow sensing device of claim 20, wherein the bypass fluid flow channel includes a second bend, wherein the second bend is downstream of the second tapered region.

22. The fluid flow sensing device of claim 20, wherein the first portion of the first tapered region is upstream of the second portion of the first tapered region, and wherein the second taper rate is greater in magnitude than the first taper rate.

23. The fluid flow sensing device of claim 22, wherein the second portion of the second tapered region is downstream of the first portion of the second tapered region, and wherein the third taper rate is larger in magnitude than the fourth taper rate.

24. The fluid flow sensing device of claim 16, wherein the bypass fluid flow path is defined by a fluid flow tube.

* * * * *